United States Patent
Sikora et al.

(10) Patent No.: US 10,378,089 B2
(45) Date of Patent: Aug. 13, 2019

(54) METHOD AND DEVICE FOR PARTIALLY HARDENING SEMIFINISHED PRODUCTS

(71) Applicant: THYSSENKRUPP STEEL EUROPE AG, Duisburg (DE)

(72) Inventors: Sascha Sikora, Lünen (DE); Jörg Gorschlüter, Hamm (DE); David Pieronek, Dortmund (DE)

(*) Notice: Subject to any disclaimer, the term of this patent is extended or adjusted under 35 U.S.C. 154(b) by 414 days.

(21) Appl. No.: 14/907,785

(22) PCT Filed: Jul. 18, 2014

(86) PCT No.: PCT/EP2014/065515
§ 371 (c)(1),
(2) Date: Jan. 26, 2016

(87) PCT Pub. No.: WO2015/011051
PCT Pub. Date: Jan. 29, 2015

(65) Prior Publication Data
US 2016/0160326 A1    Jun. 9, 2016

(30) Foreign Application Priority Data
Jul. 26, 2013  (DE) .................. 10 2013 108 046

(51) Int. Cl.
*C22C 38/00*    (2006.01)
*C21D 1/00*    (2006.01)
(Continued)

(52) U.S. Cl.
CPC ............. *C22C 38/00* (2013.01); *C21D 1/00* (2013.01); *C21D 1/40* (2013.01); *C21D 1/42* (2013.01);
(Continued)

(58) Field of Classification Search
CPC ........ C21D 9/0062; C21D 6/00; C21D 1/673; C21D 1/00
See application file for complete search history.

(56) References Cited

U.S. PATENT DOCUMENTS

2003/0090032 A1    5/2003   Sundgren et al.
2010/0084892 A1*   4/2010   Yoshida ................... B21D 7/08
                                                      296/203.02
(Continued)

FOREIGN PATENT DOCUMENTS

DE        10012974 C1 *   3/2001    ............. B23P 15/00
DE        10012974 C1     3/2001
(Continued)

OTHER PUBLICATIONS

English Translation of International Search Report for PCT/EP2014/065515 dated Oct. 10, 2014 (mailing date Oct. 21, 2014).
(Continued)

*Primary Examiner* — Colleen P Dunn
*Assistant Examiner* — Jeremy C Jones
(74) *Attorney, Agent, or Firm* — RMCK Law Group PLC

(57) ABSTRACT

Methods for using a mold to partially harden semifinished products, which are comprised of hardenable steel and have at least partially an open-profile or closed-profile cross section, may involve a number of steps. For example, such methods may involve heating regions of a semifinished product above an $A_{C1}$ temperature, positioning the semifinished producing in a mold, positioning an active mold cooling element adjacent to or in contact with the heated regions of the semifinished product, and cooling the regions of the semifinished product at a defined cooling rate so that a hardened microstructure in the cooled regions. These methods and corresponding devices provide low cost solutions that dispense with complete hardening of semifinished (Continued)

products and/or employing welded connections to provide various mechanical properties.

15 Claims, 5 Drawing Sheets

(51) Int. Cl.
    *C21D 1/40*     (2006.01)
    *C21D 1/42*     (2006.01)
    *C21D 6/00*     (2006.01)
    *C21D 9/00*     (2006.01)
    *C21D 9/48*     (2006.01)
    *C21D 1/673*     (2006.01)

(52) U.S. Cl.
    CPC ............... *C21D 1/673* (2013.01); *C21D 6/00* (2013.01); *C21D 9/0062* (2013.01); *C21D 9/48* (2013.01); *C21D 2211/00* (2013.01); *Y02P 10/253* (2015.11)

(56) References Cited

U.S. PATENT DOCUMENTS

| | | |
|---|---|---|
| 2011/0011499 A1 | 1/2011 | Lengauer et al. |
| 2011/0045316 A1 | 2/2011 | Brandstaetter et al. |
| 2012/0023748 A1 | 2/2012 | Pohl |
| 2013/0032257 A1* | 2/2013 | Boettcher ............ B21D 22/022 148/714 |
| 2014/0124104 A1* | 5/2014 | Trippe ................. B21D 22/022 148/566 |
| 2016/0024608 A1* | 1/2016 | Singh ..................... C21D 1/673 148/653 |

FOREIGN PATENT DOCUMENTS

| | | |
|---|---|---|
| DE | 10 2007 043 154 A1 | 4/2009 |
| JP | H11140537 A | 5/1999 |
| JP | 2000178640 A | 6/2000 |
| JP | 2002020854 A | 1/2002 |
| JP | 2009534196 A | 9/2009 |
| JP | 2011179028 A | 9/2011 |
| JP | 2012149333 A | 8/2012 |
| WO | 2008/123506 A | 10/2008 |
| WO | 2011/026712 A2 | 3/2011 |
| WO | 2013/001630 A | 1/2013 |

OTHER PUBLICATIONS

English Abstract of JP2002020854.

\* cited by examiner

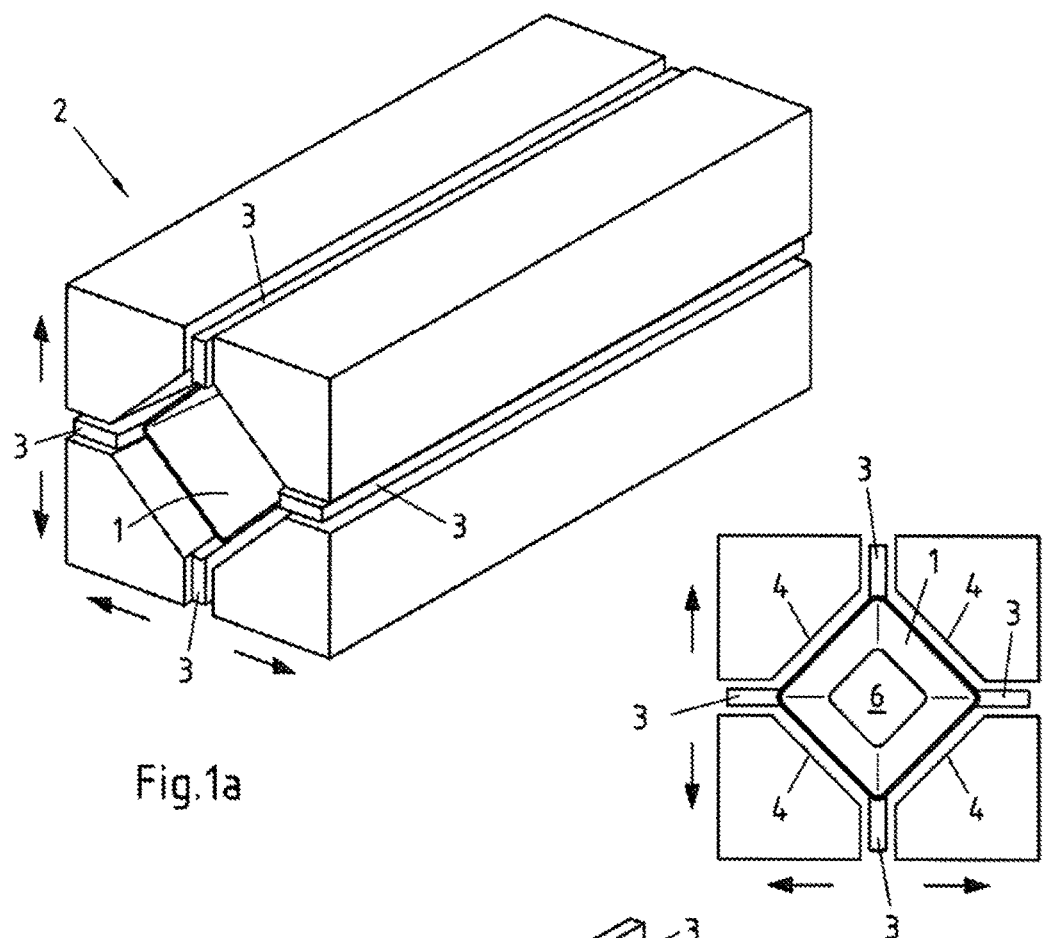
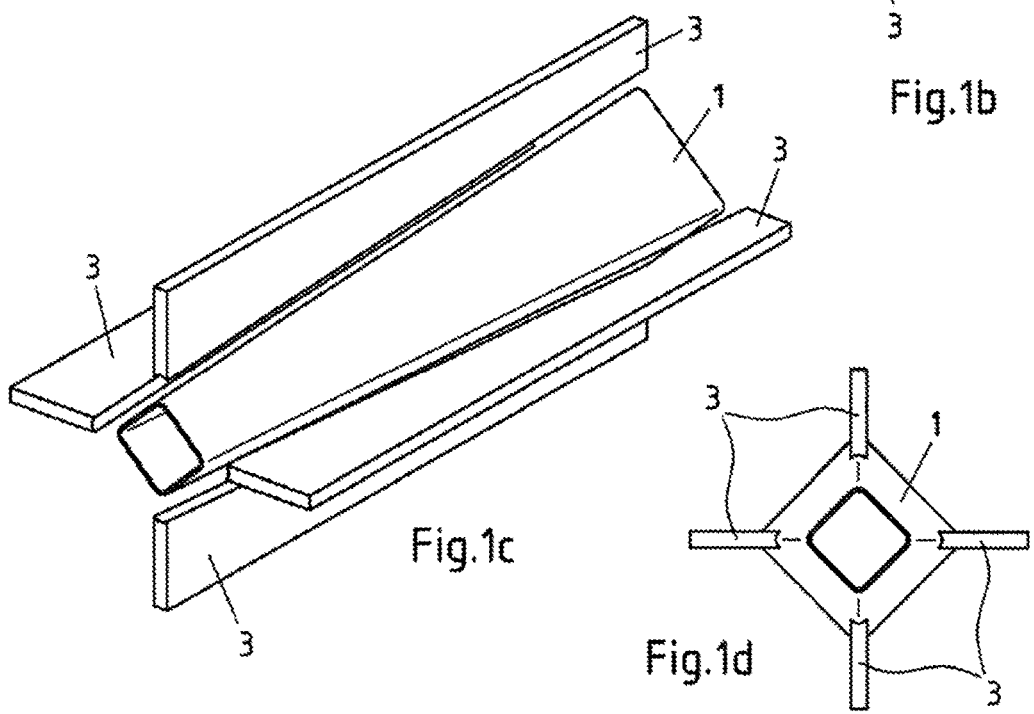

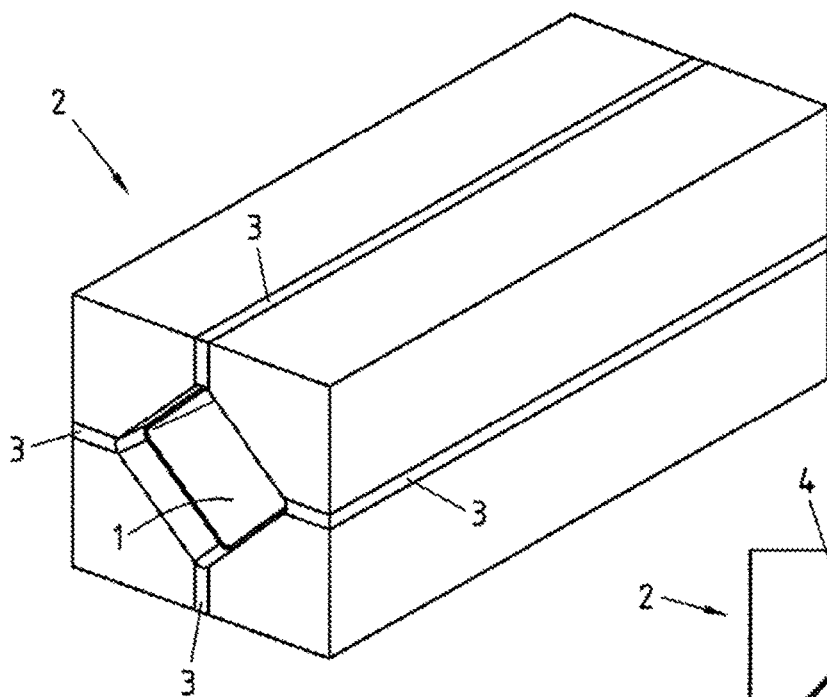
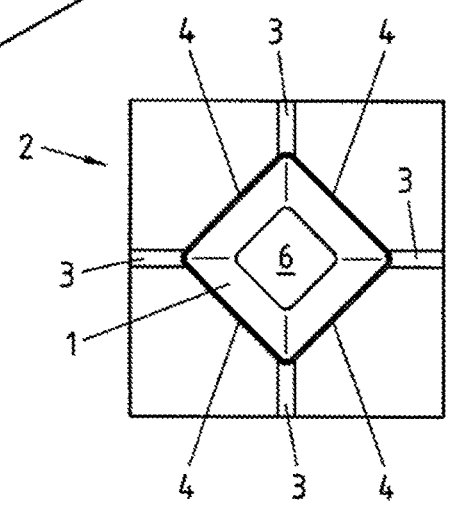
Fig.2a
Fig.2b
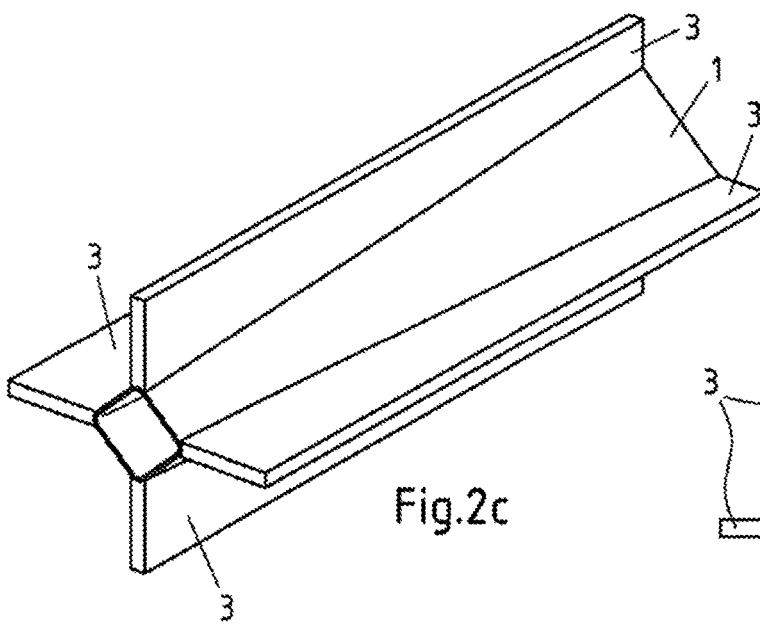
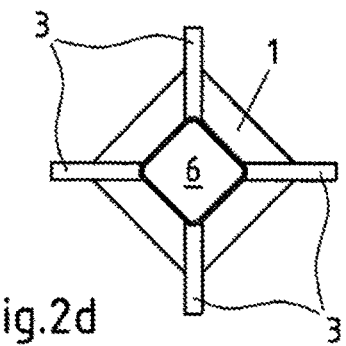
Fig.2c
Fig.2d

US 10,378,089 B2

METHOD AND DEVICE FOR PARTIALLY HARDENING SEMIFINISHED PRODUCTS

CROSS REFERENCE TO RELATED APPLICATIONS

This application is a U.S. National Stage Entry of International Patent Application Serial Number PCT/EP2014/065515, filed Jul. 18, 2014, which claims priority to German Patent Application No. DE 102013108046.4 filed Jul. 26, 2013, the entire contents of both of which are incorporated herein by reference.

FIELD

The present disclosure relates to methods for partially hardening semifinished products.

BACKGROUND

In order to provide components that are designed appropriately for the loads occurring, it is known to produce semifinished products known as "tailored blanks" with different material properties, which consist of different materials or material thicknesses to be welded to one another that ensure the various mechanical properties. It is additionally known, as an alternative to this, to achieve the various different mechanical properties by a microstructural transformation. Used for this purpose are hardenable steel materials, which are partially brought to a temperature above the $Ac_1$ temperature point or the $Ac_3$ temperature point and are subsequently rapidly cooled, so that the austenitic structure that is above the $Ac_1$ temperature or the $Ac_3$ temperature is at least partially transformed into a martensitic structure. In the case for example of manganese-boron steels, this martensitic structure can then provide tensile strengths of up to 2000 MPa in the hardened state.

Japanese patent application JP 2002-020854 A discloses for example a method for producing a shaped metal body that consists of two different profiles, the component consisting of a first profile and a second profile, one of the profiles having undergone a hardening process. However, the component produced in this way and designed appropriately for the loads occurring still has a weld seam and must therefore still undergo a number of working steps to provide different mechanical properties in one component. To this extent, the cost-effectiveness of producing components with mechanical properties appropriate for the loads occurring that provide the mechanical properties by microstructural transformations can be improved.

Therefore, a need exists for low-cost method methods and devices for partially hardening semifinished products that have at least partially the cross-sectional form of an open or closed profile, so that it is possible to dispense with complete hardening of the semifinished product or the provision of a welded connection to provide various mechanical properties.

BRIEF DESCRIPTION OF THE FIGURES

FIG. 1a is a perspective view of an example device for partially hardening semifinished products.

FIG. 1b is a front view of the example device shown in FIG. 1a.

FIG. 1c is a perspective view of example active mold cooling elements that can be used in the example device of FIGS. 1a-1b.

FIG. 1d is a front view of the example active mold cooling elements shown in FIG. 1c.

FIG. 2a is a perspective view of the example device for partially hardening semifinished products of FIG. 1a shown in a closed state.

FIG. 2b is a front view of the example device for partially hardening semifinished products of FIG. 1a shown in a closed state.

FIG. 2c is a perspective view of the example mold cooling elements of FIG. 1c shown in a closed state.

FIG. 2d is a front view of the example active mold cooling elements of FIG. 2c.

DETAILED DESCRIPTION

Figure 3:
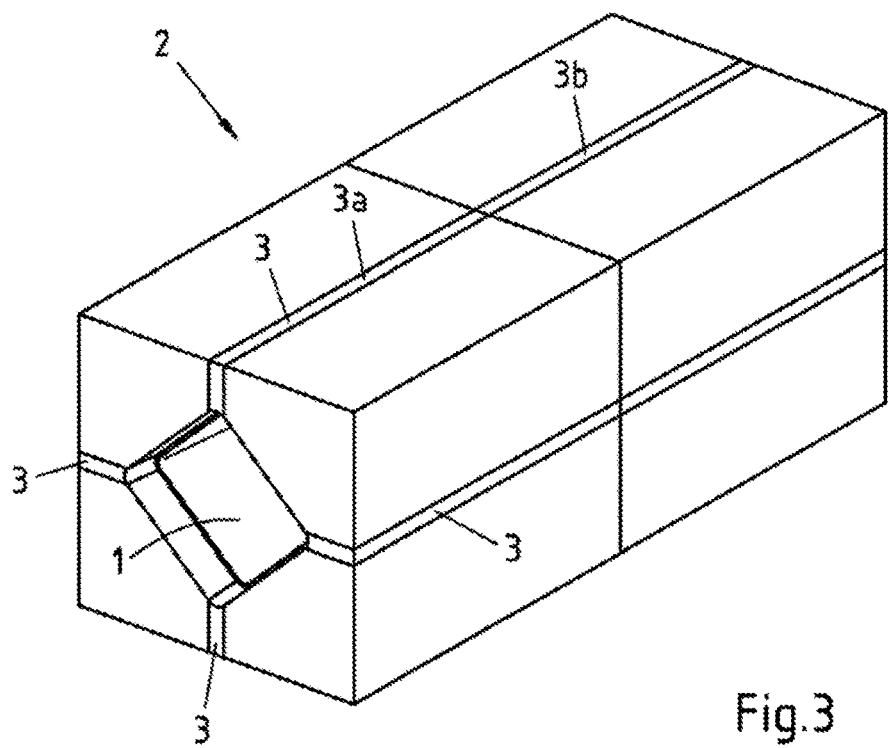
FIG. 3 is a perspective view of another example device for partially hardening semifinished products.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure concerns methods and devices for partially hardening semifinished products that comprise a hardenable steel. Some example semifinished products at least partially have a cross-sectional form of an open or closed profile. The semifinished product may be placed into a mold to be partially hardened.

One example method for partially hardening a semifinished product may include the following steps:

heating at least one region to be hardened of the semifinished product to a temperature above the $Ac_1$ temperature of the material of the semifinished product, placing the at least locally heated semifinished product into a mold, closing the mold and bringing at least one active mold cooling element up close to at least one region to be hardened of the semifinished product, cooling at least the at least one region to be hardened of the semifinished product at a defined cooling rate, so that a hardened microstructure is produced in the cooled regions.

It has been found that a partial hardening of a semifinished product that has a cross-sectional form that has at least partially the form of an open or closed profile can be hardened particularly precisely and locally in a mold by active mold cooling elements. The microstructural transformation is achieved by active mold cooling elements which, with the semifinished product placed in, approach the regions to be hardened of the semifinished product and thus harden the semifinished product at least in a locally delimited manner. It is also conceivable that the semifinished product is heated completely to a temperature above the $Ac_1$ or $Ac_3$ temperature point. As a result of the subsequent cooling of the regions to be hardened at a defined, i.e. sufficient, cooling rate for producing a hardened microstructure, in the regions to be hardened there is then at least partially a martensitic structure, which leads to a distinct increase in strength of the component/semifinished product. The cooling rates that are necessary for producing a hardened microstructure are dependent on the respective material. At the same time, there is generally a lower limit for the cooling rate that has to be maintained for the formation of the hardened microstructure. For example in the case of a 22MnB5 material, this lower limit of the cooling rate is 27 K/s. The method allows hardening to be ensured in locally delimited regions, in order to provide a semifinished product/component designed appropriately for the loads occurring, to be used in particular in motor vehicle construction.

According to a first refinement of the method, the at least one region to be hardened extends at least partially axially and/or radially in the semifinished product and is hardened by at least one active mold cooling element. Axially extending regions to be hardened in a semifinished product have the advantage that they significantly increase the stiffness of the semifinished product in the longitudinal direction. In the case of axially loaded components, for example in a motor vehicle, in particular, these axially extending regions lead to a significant improvement in the energy absorption capacity in the axial direction. On the other hand, radially extending, hardened regions increase the buckling stiffness of the semifinished product in the corresponding regions. The active mold cooling elements allow both regions, not only regions that are to be hardened radially but also regions that are to be hardened axially, to be introduced very precisely into the semifinished product and the hardening of these regions to be ensured.

According to a further embodiment of the method, at least one active mold cooling element is in heat-conducting contact with the at least one region to be hardened of the semifinished product and the hardening of the region to be hardened of the semifinished product takes place at least partially by heat conduction. As a result, the regions to be hardened can be very precisely confined, in that for example the other regions have no contact with the active mold cooling element and consequently no martensitic structure or no completely martensitic structure can develop.

According to a further embodiment, the at least local heating of the semifinished product preferably takes place by using electrical current flow and/or by induction. Electrical current flow likewise allows locally very delimited regions to be brought to a high temperature very quickly. This also applies to the heating of the regions by induction, eddy currents being induced in the regions to be hardened of the semifinished product that are to be heated, likewise leading to very rapid heating of very locally delimited regions of the semifinished product. Alternatively, complete heating of the semifinished product is also possible, for example in a furnace, preferably in a continuous furnace.

The semifinished product to be partially hardened preferably has at least one edge, the edge radius of the at least one edge of the semifinished product being at least partially hardened. According to the invention, the edge radius corresponds to the curved region of the edge perpendicularly to the extent of the edge. The edge radius extends in a radial direction preferably symmetrically to both sides of the edge and in the axial direction along the edge. The edge radius corresponds to the region of the edge of the semifinished product that is passed over by an imaginary circle with a corresponding radius, the curvature at the center of the edge giving the imaginary radius and the center point of the imaginary circle. In particular in the case of axially loaded components, the hardening of the edge radius of the edges provides a particular potential for increase with respect to the energy absorption capacity in relation to the deformation displacement. If the edge radius is only partially hardened in the radial plane, the energy absorption capacity can also be set. A precisely definable deformation behavior can also likewise be achieved by the prescribed hardening of the edges, that is to say by the proportion of the overall microstructure that is made up of hardened microstructure. With particular preference, the edge or the edges is/are hardened over its/their entire length.

According to a further refinement, components with a high axial energy absorption capacity can be provided by the semifinished product having at least partially the cross-sectional form of a polygonal, closed profile and at least one of the axially extending edges being at least partially hardened. The hardening of the edges in this case takes place again by at least partial hardening of the edge radii, as defined above.

It may also be advantageous to provide different hardened regions with different strengths. This can be achieved in a preferred way by at least one active mold cooling element that is subdivided axially and/or radially into at least two segments hardening the region to be hardened. On the one hand, the division of the active mold cooling element into a number of segments has the effect that a complex shaping of the semifinished product can be hardened with simple active mold cooling elements. On the other hand, according to a further refinement of the method, an active mold cooling element subdivided into at least two segments makes it possible that the different segments of the at least one active mold cooling element cools the associated regions of the semifinished product down to different temperatures. This also allows a different degree of hardening of the regions of the semifinished product that are associated with the segments to be produced. As a result, further flexibility can be achieved with regard to a design of the semifinished product that is appropriate for the loads occurring.

To make possible a particularly controlled cooling behavior of the regions to be hardened of the semifinished product that are heated to above the $Ac_1$ temperature, according to a further refinement of the method the regions to be hardened of the semifinished product are cooled at a defined cooling rate by heat-conducting contact of the mold with regions of the semifinished product adjoining the regions to be hardened, so that a hardened microstructure is produced in the regions to be hardened of the semifinished product. In other words, a heat-conducting contact between the mold and the adjoining regions of the semifinished product is established adjacent the regions to be hardened, so that the regions to be hardened are also cooled very rapidly by means of heat flow. The invention makes use of the fact that steel parts generally have a very good thermal conductivity, and consequently intense cooling of the regions to be hardened can also take place by the heat-conducting contact of regions adjacent the regions to be hardened of the semifinished product. Cooled active areas of the mold may be used for example for this purpose.

According to a further refinement of the method, to assist the cooling process, in addition or as an alternative the mold may be at least partially flowed through by a cooling medium, which is at least partially in direct contact with the semifinished product or in heat-conducting contact with the semifinished product, for cooling the semifinished product. A semifinished product with at least one hardened edge region is preferably produced for a structure or body of a motor vehicle. This semifinished product can for example be used particularly well as a profile that is subjected to axial force in a motor vehicle structure or body. It has a particularly high energy absorption capacity coupled with a short deformation displacement.

Preferably, a semifinished product of a manganese-boron steel, a dual-phase steel or a residual-austenite (TRIP) steel is partially hardened, particularly good increases in strength being possible with said grades of steel.

According to a second teaching of the present invention, the object presented is also achieved by a device for hardening a semifinished product that has at least partially the cross-sectional form of an open and/or closed profile in that at least one active mold cooling element is provided, arranged movably in relation to the placed-in semifinished product and having cooling means by way of which the at least one region to be hardened of the semifinished product can be cooled at a defined or sufficient cooling rate, so that a hardened microstructure is produced in the regions cooled in a defined manner. The active mold cooling elements provided in the mold for hardening the at least one region to be hardened of the semifinished product make it possible after placing in the semifinished product to achieve a very precise repetition accuracy with respect to the regions to be hardened.

According to a first refinement of the device, the at least one active mold cooling element extends at least partially axially and/or radially in relation to the semifinished product to be partially hardened. Optionally, the active mold cooling element is divided into radially and/or axially extending segments, which makes greater flexibility in the provision of regions to be hardened in the semifinished product possible. A plurality of active mold cooling elements are preferably provided, in order, if necessary, to produce the various regions to be hardened of the semifinished product.

According to a further refinement of the device, the at least one active mold cooling element has guiding means for a cooling medium, which are formed for example as coolant channels through which a cooling medium in fluid form, such as for example water or a cooling gas, can flow. These cooling media allow the cooling rate of the regions of the mold that are in contact with the active mold cooling elements to be actively controlled, for example by the respective temperature of the cooling media.

If active areas that are at least temporarily in heat-conducting contact with regions of the semifinished product adjoining the regions to be hardened are provided in the device, it is possible to achieve the effect that the regions to be hardened are cooled at a high cooling rate, and thus the desired microstructural transformation into a hardened microstructure is achieved, by means of heat flow. With preference, the active areas are movably arranged and, for example after reaching the desired temperature above the $Ac_1$ temperature or above the $Ac_3$ temperature of the material of the regions to be hardened, can be placed against the adjacent regions of the semifinished product, so that the cooling of the regions to be hardened takes place rapidly.

The cooling of the regions to be hardened can be assisted in an easy way by the device having means with which a cooling medium can be made to pass through the device at least partially in direct or heat-conducting contact with the semifinished product to be hardened. The cooling medium can thus additionally increase the cooling rate of the regions to be hardened, and thereby bring about the desired microstructural transformation in these regions.

FIGS. 1 and 2 show a method for partially hardening a semifinished product 1 in a mold 2, the semifinished product having at least partially the cross-sectional form of a closed profile. FIGS. 1a, b, c and d show here the slightly opened mold with a placed-in semifinished product 1 in respectively different perspective, schematic view. The semifinished product 1 has been placed into the opened mold 2. The mold 2 consists here of at least two mold halves, which can be moved with respect to one another in such a way that the semifinished product 1 can be placed in. The semifinished product 1 itself consists of a hardenable steel, which forms an austenitic structure when heated to above the $Ac_1$ temperature of the material. As from the $Ac_3$ temperature of the material, there is then a completely austenitic structure, which when cooled at a defined cooling rate forms a hardened microstructure, preferably a martensitic structure. The mold also has active mold cooling elements 3, which extend axially along the semifinished product 1 at the corresponding edge regions of the semifinished product 1. FIG. 1b) then shows a schematic front view of the mold 2 with the active mold cooling elements 3, which are not lying against the semifinished product 1 because the mold 2 has been slightly opened. The semifinished product 1 has a conical cross-sectional profile, which can likewise be seen in FIGS. 1b and 1c.

In order to illustrate the distance of the active mold cooling elements 3 from the semifinished product 1, only the semifinished product 1 and the active mold cooling elements 3 extending along the edge regions are illustrated in FIG. 1c. The active mold cooling elements 3 contain guiding means (not shown) for a cooling medium, that is to say for example cooling channels, through which the fluid-like cooling medium can flow. The edge regions of the semifinished product 1, which have for example been heated to a temperature above the $Ac_1$ temperature point of the material of the semifinished product, can be actively cooled by way of these mold cooling elements 3. Also in FIG. 1d, it is shown once again that the active mold cooling elements are initially kept at a distance when the semifinished product 1 is placed into the mold. In the schematic front view, FIG. 1d, only the active mold cooling elements 3 and the semifinished product 1 are illustrated. As already stated above, the active mold cooling elements may have as cooling means for example regions that are in heat-conducting contact with the regions to be hardened of the semifinished product 1 and the regions of the semifinished product may be at least partially cooled by heat conduction.

FIG. 2a then shows the exemplary embodiment from FIG. 1a in a perspective, schematic view in a closed state, the active mold cooling elements 3 having been brought up close to the semifinished product 1 and, in the present case, being in heat-conducting contact with the semifinished product 1. The axially extending edge regions of the semifinished product 1, which have been heated to a temperature above the $Ac_1$ temperature point, preferably above the $Ac_3$ temperature point, of the material of the semifinished product, are then rapidly cooled by the active cooling elements 3, so that a hardness structure develops. The active mold cooling elements 3, which are only schematically illustrated here, can provide a very delimited local hardening of the edge regions of the semifinished product 1 by the local, heat-conducting contact with the semifinished product 1. As FIG. 2b shows, the mold 2 has additional active areas 4, which are in contact with the semifinished product 1 adjacent the edge regions. In addition, after heating the complete semifinished product it is possible just by introducing the hardening into the edge region through the active mold cooling elements 3 additionally to increase the defined cooling process still further by making a cooling medium pass through the opening 6 in the closed profile 1. The cooling medium can have the effect for example of directly transporting the heat away from the region to be hardened. Both liquid and gaseous media may be taken into consideration here as the cooling media. In the case of open profiles, a cooling medium guide may be provided by a cavity formed by the mold 2 and the semifinished product 1.

Figure 4:
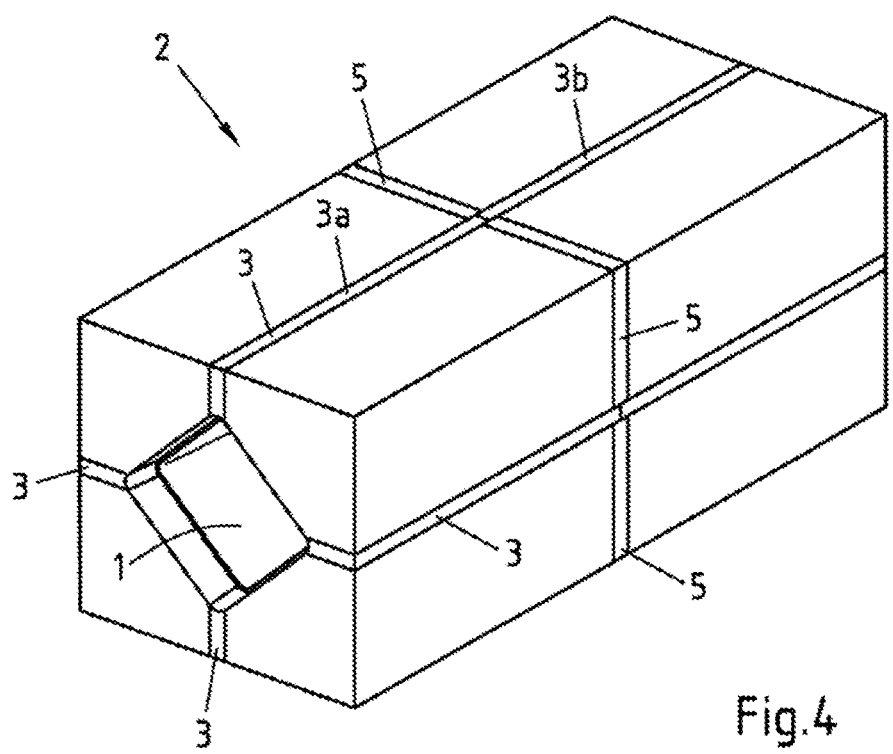
FIG. 4 is a perspective view of still another example device for partially hardening semifinished products.

FIG. 3 then shows in a perspective, schematic view a mold 2 for partially hardening a semifinished product 1 that has axially extending active mold cooling elements 3, which are subdivided in the axial direction into two segments 3a and 3b. Both the individual axially extending, active mold cooling elements 3 and the segments of the mold cooling elements 3a and 3b may cool the associated regions of the semifinished product 1 to differing degrees with respect to one another, so that different degrees of hardening can be achieved. The same also applies for example to the radially extending active mold cooling element 5, which is indicated in FIG. 4 and is divided into radial segments. The active mold cooling elements 3 are only schematically illustrated in FIG. 1 to FIG. 4 and can bring about the hardening of the semifinished product.

Figure 5:
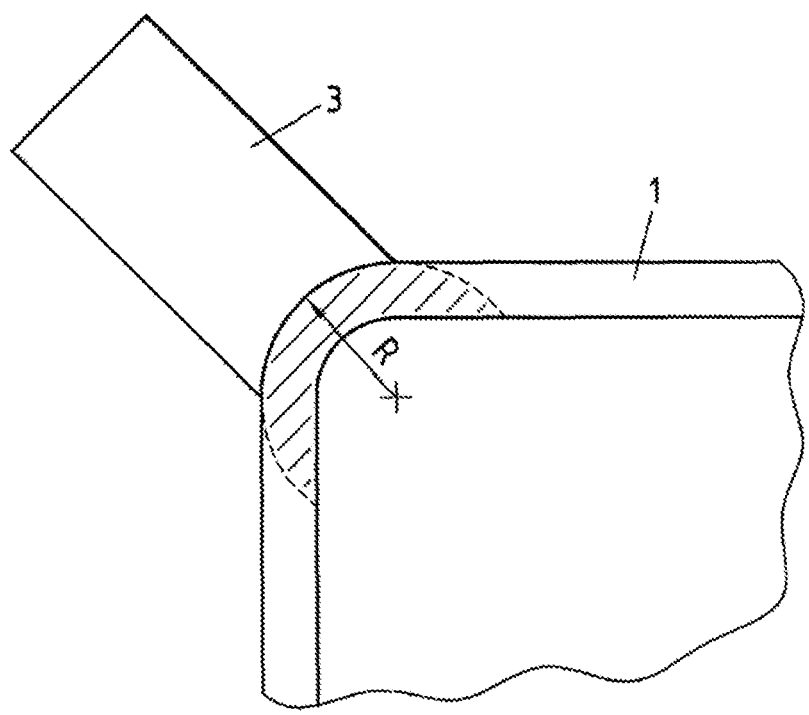
FIG. 5 is a top sectional view of an edge radius of an example semifinished product to be hardened.

In FIG. 5, the edge region of a semifinished product is schematically illustrated. The edge radius R corresponds to the outer radius of the semifinished product 1 at the center of the edge. The region of the semifinished product that is passed over by the radius R is defined as the edge to be hardened, which is hardened by way of the likewise schematically illustrated active mold cooling element 3.

Figure 6:
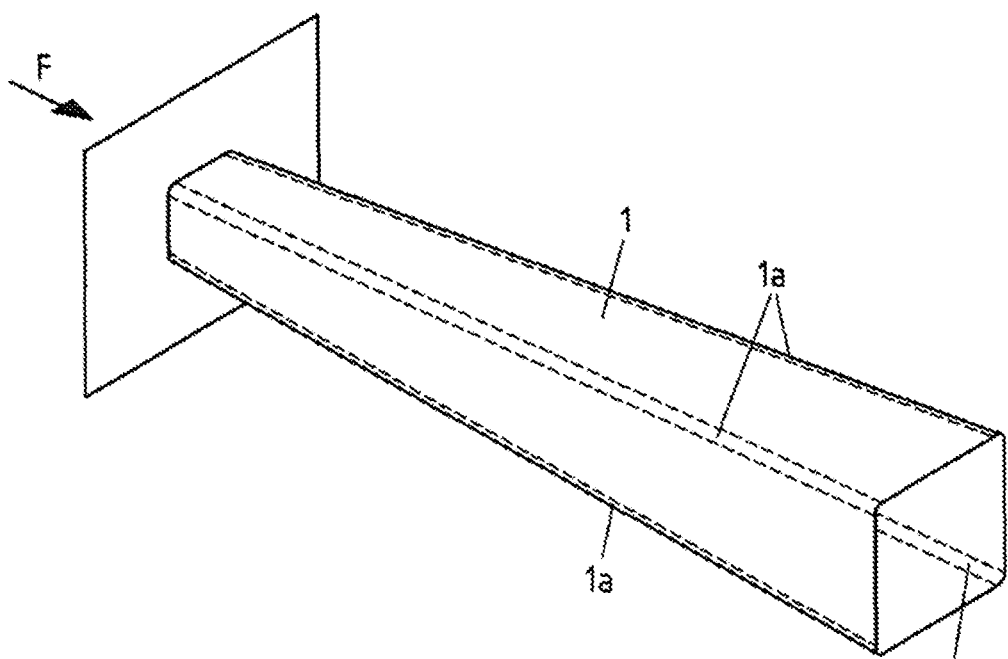
FIG. 6 is a schematic view of an example semifinished product produced according to one of the methods of the present disclosure.
Figure 8:
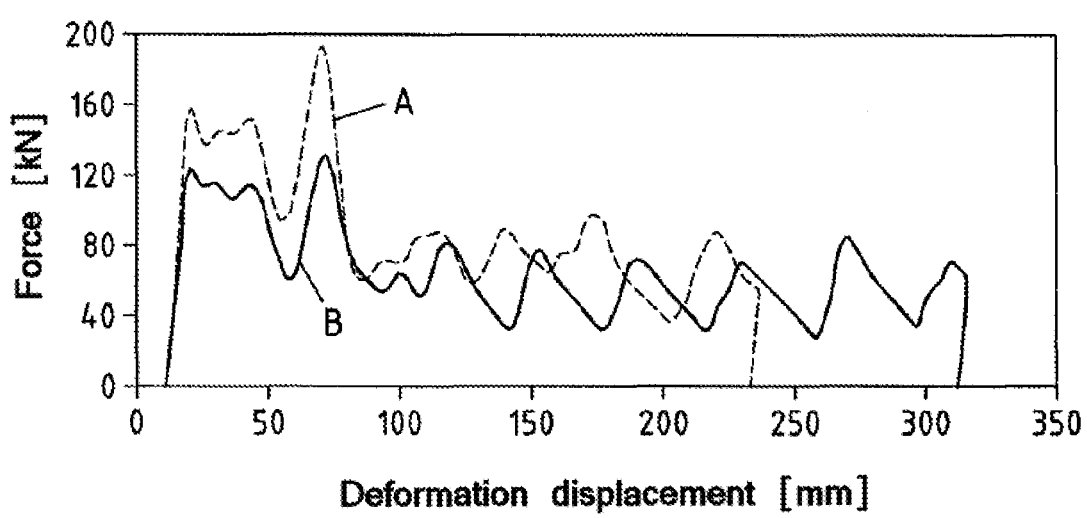
FIG. 8 is a diagram showing force/deformation-displacement behavior of the example semifinished product shown in FIG. 6.

FIG. 6 then shows in a schematic view a semifinished product 1 that has hardened edge radii 1a and, as indicated in FIG. 8, is subjected to a deformation test. For this purpose, a force F is exerted on the conically tapering region of the semifinished product 1 in the axial direction.

Figures 7A, 7B:
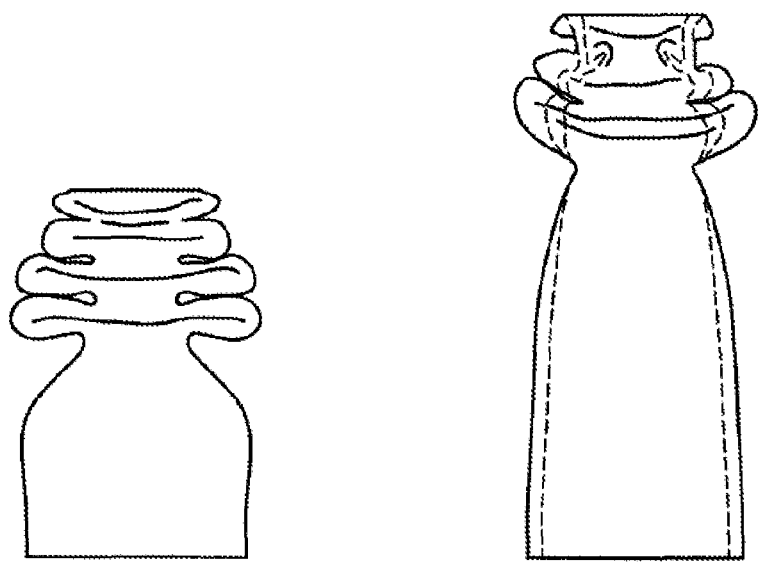
FIG. 7a is a side view showing deformation of a conventional semifinished product.
FIG. 7b is a side view showing deformation of a partially hardened semifinished product that has been treated according to one of the methods of the present disclosure.

FIG. 7 shows the result of the deformation test in a comparison with a conventional semifinished product 1'. In the deformation test of the conventional semifinished product 1 in FIG. 7a, it can be clearly seen that the deformation displacement under an identical force is greater. Like the conventional semifinished product, the semifinished product from FIG. 7b likewise shows a controlled deformation behavior with a significantly smaller deformation displacement and the same absorption energy absorbed. The hardening of the edges, that is to say therefore of the edge radii along the axial direction, has the effect that there is a considerable stiffening of the profile produced. This also applies in an analogous way to open profiles.

In FIG. 8, the deformation-displacement/force diagram is illustrated, the area underneath the two curves respectively representing the energy absorbed. The semifinished product locally hardened at the edges and produced by the method according to the invention is illustrated by the dashed curve A and has a significantly higher energy absorption in the initial region up to when the formation of the folds occurs. As from a deformation displacement of approximately 75 mm, the deformation behavior of the semifinished product hardened in the edge regions is virtually identical to that of the conventional semifinished product in curve B. However, the deformation displacement ends at a calculated 240 mm, in comparison with 310 mm in the case of the conventional semifinished product.

As can be seen, it is possible with the method according to the invention and with the device according to the invention to provide a semifinished product that not only can be produced in a low-cost way but also has advantageous deformation properties, so that the semifinished product can be produced to provide for example parts of a structure or body of a motor vehicle that are subjected to axial loading.

What is claimed is:

1. A method for partial hardening of a semifinished product in a mold, the semifinished product comprising hardenable steel and having at least partially an open-profile or a closed-profile cross-section with an edge desired to be hardened, the method comprising:

heating a region of the semifinished product to a temperature above an $A_{C1}$ temperature of a composition of the semifinished product, the region including the edge;

placing at a minimum the region of the semifinished product in the mold;

moving an active mold cooling element into heat conducting contact with the edge desired to be hardened; and cooling, with the active mold cooling element, at only the edge desired to be hardened with a defined cooling rate that produces a hardened microstructure in the region, wherein at least an edge radius of the edge of the semifinished product is hardened while leaving free of hardening other regions of the semifinished product.

2. The method of claim 1 wherein the region of the semifinished product extends at least partially in at least one of an axial direction or a radial direction, wherein the region is hardened by the active mold cooling element.

3. The method of claim 2 wherein the region comprises a first region and a second region, wherein the cooling of the first and second regions to produce the hardened microstructure is performed by two or more segments of the active mold cooling element, wherein the two or more segments of the active mold cooling element are formed by subdividing the active mold cooling element at least one of axially or radially.

4. The method of claim 3 wherein a first segment of the two or more segments cools the first region of the semifinished product to a first temperature, wherein a second segment of the two or more segments cools the second region of the semifinished product to a second temperature that is different than the first temperature.

5. The method of claim 1 wherein the step of positioning the active mold cooling element comprises positioning the active mold cooling element in heat-conducting contact with the region of the semifinished product, wherein the production of the hardened microstructure in the region occurs at least partially by heat conduction.

6. The method of claim 1 wherein the heating of the region of the semifinished product comprises heating by at least one of electrical current flow or induction.

7. The method of claim 1 wherein the cross-section of the semifinished product comprises a polygonal closed profile, wherein at least one axially-extending edge radii of the semifinished product is at least partially hardened.

8. The method of claim 1 wherein the cooling of the region at the defined cooling rate to produce the hardened microstructure in the region occurs by heat-conducting contact between the mold and one or more areas of the semifinished product adjoining the at least one region.

9. The method of claim 1 wherein the cooling of the region comprises circulating a cooling medium through at least a portion of the mold, wherein the cooling medium is in at least one of direct contact with the semifinished product or heat-conducting contact with the semifinished product.

10. The method of claim 1 wherein the region of the semifinished product is an edge region, wherein the semifinished product is produced for a structure of a body of a motor vehicle.

11. The method of claim 1 wherein the semifinished product comprises manganese-boron steel, a dual-phase steel, or a residual austenite (TRIP) steel.

12. The method of claim 1, comprising cooling multiple regions at a defined cooling rate to produce a hardened microstructure in said multiple regions.

13. The method of claim 12, wherein each of the multiple regions includes a respective edge.

14. The method of claim 13, comprising multiple active mold cooling elements, individual ones of the multiple mold cooling elements being positioned adjacent to or in contact with a corresponding one of the multiple regions.

15. The method of claim 14, comprising multiple other regions distinct from and arranged between adjacent ones of the multiple regions, the multiple other regions left free of hardening.

* * * * *